(12) United States Patent
Herrick, IV

(10) Patent No.: US 6,290,051 B1
(45) Date of Patent: Sep. 18, 2001

(54) DECELERATOR FOR LARGE CONVEYORS

(75) Inventor: Harold Herrick, IV, Highland Village, TX (US)

(73) Assignee: Dallas A.C. Horn & Co., Dallas, TX (US)

( * ) Notice: Subject to any disclaimer, the term of this patent is extended or adjusted under 35 U.S.C. 154(b) by 0 days.

(21) Appl. No.: 09/575,082

(22) Filed: May 19, 2000

Related U.S. Application Data

(63) Continuation of application No. 09/274,426, filed on Mar. 22, 1999, now Pat. No. 6,112,877.

(51) Int. Cl.⁷ .................................................. B65G 21/20
(52) U.S. Cl. ...................................... 198/345.3; 193/35 A
(58) Field of Search ............................ 198/348.1, 348.3; 143/35 A

(56) References Cited

U.S. PATENT DOCUMENTS

| | | | |
|---|---|---|---|
| 4,289,229 | * 9/1981 | Keller | 193/35 A X |
| 5,168,976 | * 12/1992 | Kettelson | 193/35 A X |
| 5,676,235 | * 10/1997 | Sam et al. | 193/35 A X |
| 5,860,505 | * 1/1999 | Metzger | 198/345.3 X |
| 5,911,297 | * 6/1999 | Unterhuber | 193/35 A |
| 6,112,877 | * 9/2000 | Herrick, IV | 193/35 A |
| 6,119,843 | * 9/2000 | Robinson | 193/35 A |

FOREIGN PATENT DOCUMENTS

| | | | |
|---|---|---|---|
| 877122 | * 8/1971 | (CA) | 193/35 A |
| 557013 | * 6/1977 | (SU) | 193/35 A |

* cited by examiner

*Primary Examiner*—James R. Ridwell
(74) *Attorney, Agent, or Firm*—Michael A. O'Neil

(57) ABSTRACT

The decelerator pin is supported on a pin stop of the type used to locate a jigskid at a manufacturing location. The decelerator pin is supported with pivotal movement between a first position wherein it is positioned ahead of the pin stop with respect to the path of travel of the jigskid and a second position wherein the jigskid engages the pin stop. The decelerator pin is operatively connected to a shock absorber which slows the movement of the jigskid as it approaches the pin stop.

6 Claims, 3 Drawing Sheets

DECELERATOR FOR LARGE CONVEYORS

CROSS REFERENCE TO RELATED APPLICATIONS

This is a continuation application under 37 C.F.R. §1.60 of application Ser. No. 09/274,426 filed Mar. 22, 1999, U.S. Pat. No. 6,112,877.

TECHNICAL FIELD

This invention relates generally to large conveyors of the type used in the manufacture of automobiles and similar applications, and more particularly to a decelerator for controlling the impact of a jigskid against a pin stop.

BACKGROUND AND SUMMARY OF THE INVENTION

In the manufacture of automobiles and other large items, component parts are transported through the manufacturing process on jigskids. The jigskids having the component parts mounted thereon are in turn transported by conveyors. At various points along the path of the conveyor the movement of the jigskid is interrupted so that manufacturing operations can be carried out on the component part carried thereby.

Heretofore control over jigskid movement has been arrested at each component part work station by simply extending a pin stop into the path of travel of the jigskid. As will be appreciated, the jigskid and the component part carried thereby have considerable mass and travel at a relatively high rate of speed. The abrupt deceleration of the jigskid and the component part carried thereby upon engagement with the pin stop can therefore lead to dislocation of the component part on the jigskid, damage to the component part, damage to the jigskid, etc.

The present invention comprises a decelerator which eliminates the foregoing problems by slowing the speed of movement of the jigskid and the component part carried thereby prior to engagement of the jigskid with the pin stop. In accordance with the broader aspects of the invention, a deceleration pin is pivotally supported on the pin stop at a location slightly ahead of the pin stop with respect to the path of travel of the jigskid. As the jigskid approaches the pin stop, it first engages the deceleration pin causing pivotal movement thereof relative to the pin stop. Pivotal movement of the deceleration pin actuates a shock absorber which reduces the speed of travel of the jigskid and the component part carried thereby prior to engagement of the jigskid with the pin stop.

The deceleration pin has sufficient pivotal movement to allow the jigskid to fully engage the pin stop. This assures accurate positioning of the jigskid and the component part carried thereby during the manufacturing process. When the manufacturing process has been completed, the pin stop is withdrawn carrying the deceleration pin with it, thereby allowing the jigskid to move onwardly to the next stop in the manufacturing process. As the pin stop is withdrawn the deceleration pin is disengaged from the jigstop which allows the shock absorber to pivot the deceleration pin relative to the pin stop. When the pin stop is again positioned in the path of travel of a jigskid traveling on the conveyor, the deceleration pin is returned to its original position.

In accordance with more specific aspects of the invention, a clamping collar supports a bracket on the pin stop. A subframe is mounted on the frame of the conveyor and supports the shock absorber and a guide having a guide slot formed therein. The deceleration pin is secured to the bracket of the clamping collar by a pivot pin which extends through the guide slot. The deceleration pin is secured at its lower end to the distal end of the shock absorber.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
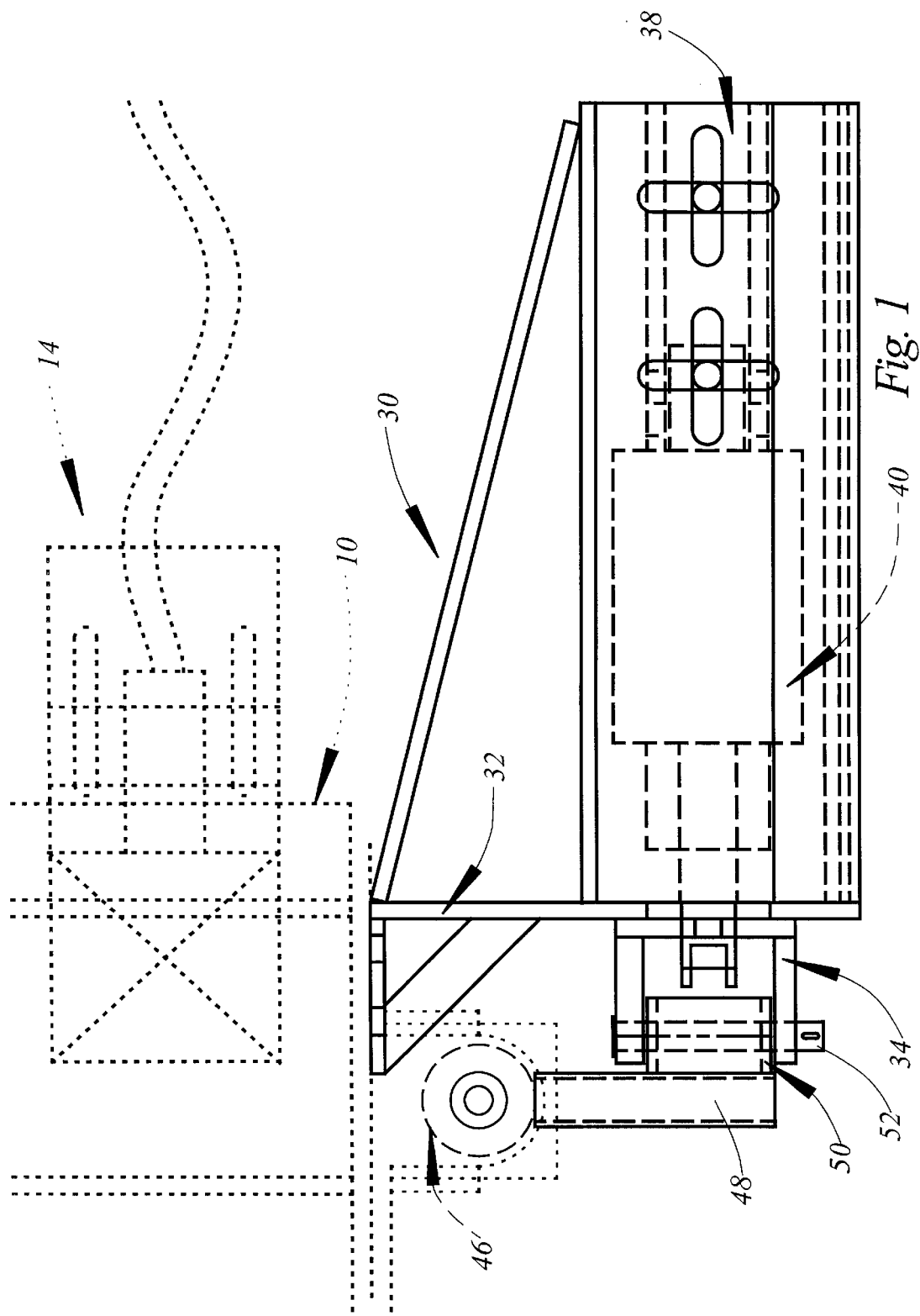
FIG. 1 is a top view of the decelerator of the present invention.
Figure 2:
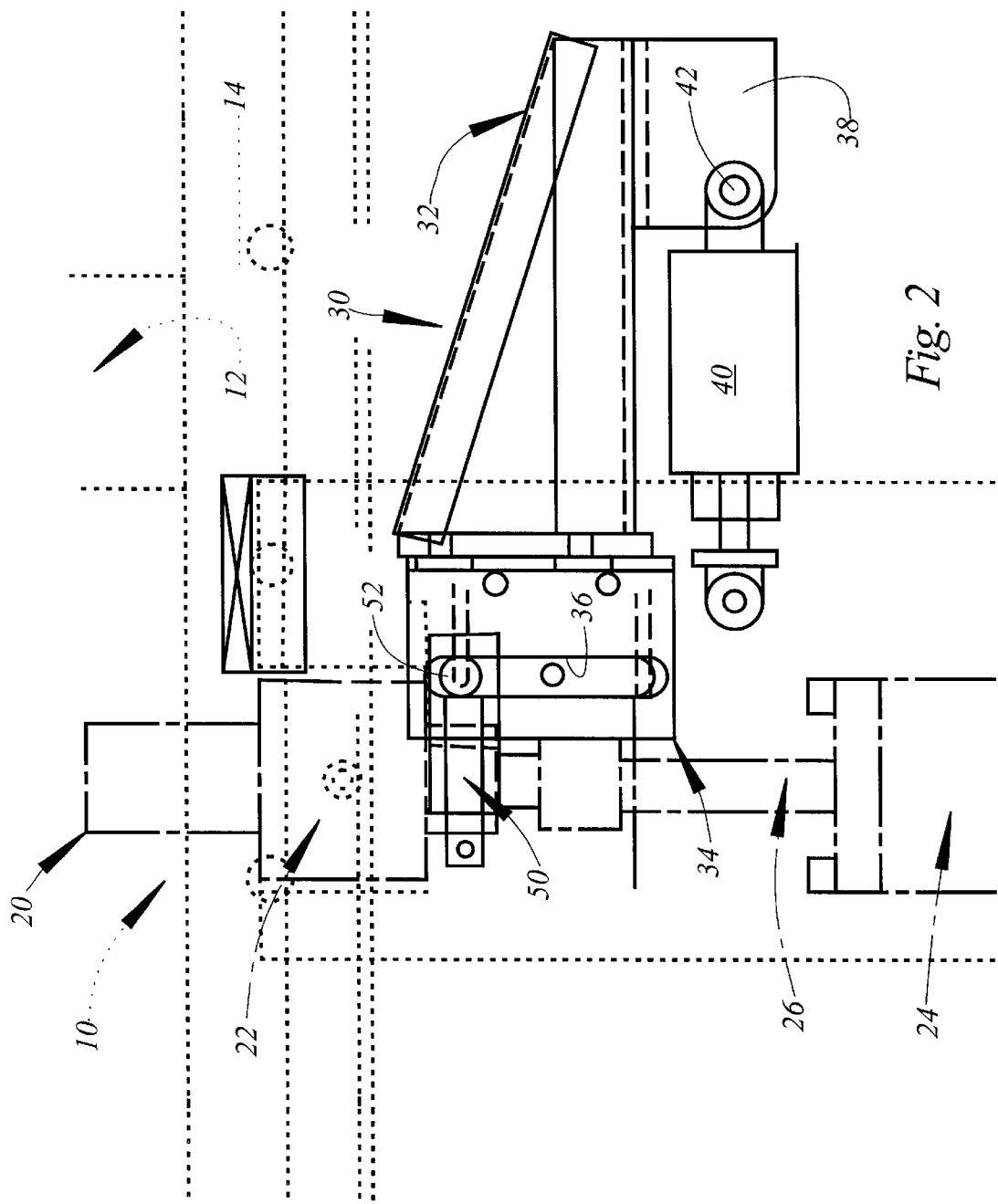
FIG. 2 is a partial front view of the decelerator of FIG. 1 in which the deceleration pin has been omitted more clearly to illustrate certain features of the invention.

Referring now to the Drawings, and particularly to FIGS. 1 and 2 thereof, there is shown a conveyor 10 of the type utilizing the manufacture of automobiles and similar large component articles. In the operation of the conveyor 10 a plurality of jigskids 12 are transported along the conveyor 10 in the direction of the arrow 14. At various points along the path of travel of the conveyor 10 the movement of each jigskid 12 is arrested in order that manufacturing operations can be carried out on the component part which is carried by the jigskid. Heretofore control over the movement of the jigskids 12 on the conveyor 10 has been controlled by the positioning of pin stops 20 in the path of travel of the jigskids 12.

Each pin stop 20 is supported on the frame of the conveyor 10 for sliding movement between the extended position shown in FIG. 2 and a retracted position wherein the jigskids 12 are permitted to move along the path of the conveyor 10 without restriction. Each pin stop 20 is slidingly supported in a bearing 22. Each pin stop 20 is selectively either extended or retracted by an operator 24 which is connected to the pin stop 20 by a rod 26. The operators 24 are conventional in nature and may be actuated pneumatically, hydraulically, etc.

The present invention comprises a decelerator 30 including a subframe 32 which is supported on the frame of the conveyor 10. The subframe 32 supports a guide member 34 having a guide slot 36 formed therein. The subframe 32 further supports a bracket 38 which is in turn connected to a shock absorber 40 by a fastener 42.

Figure 3:
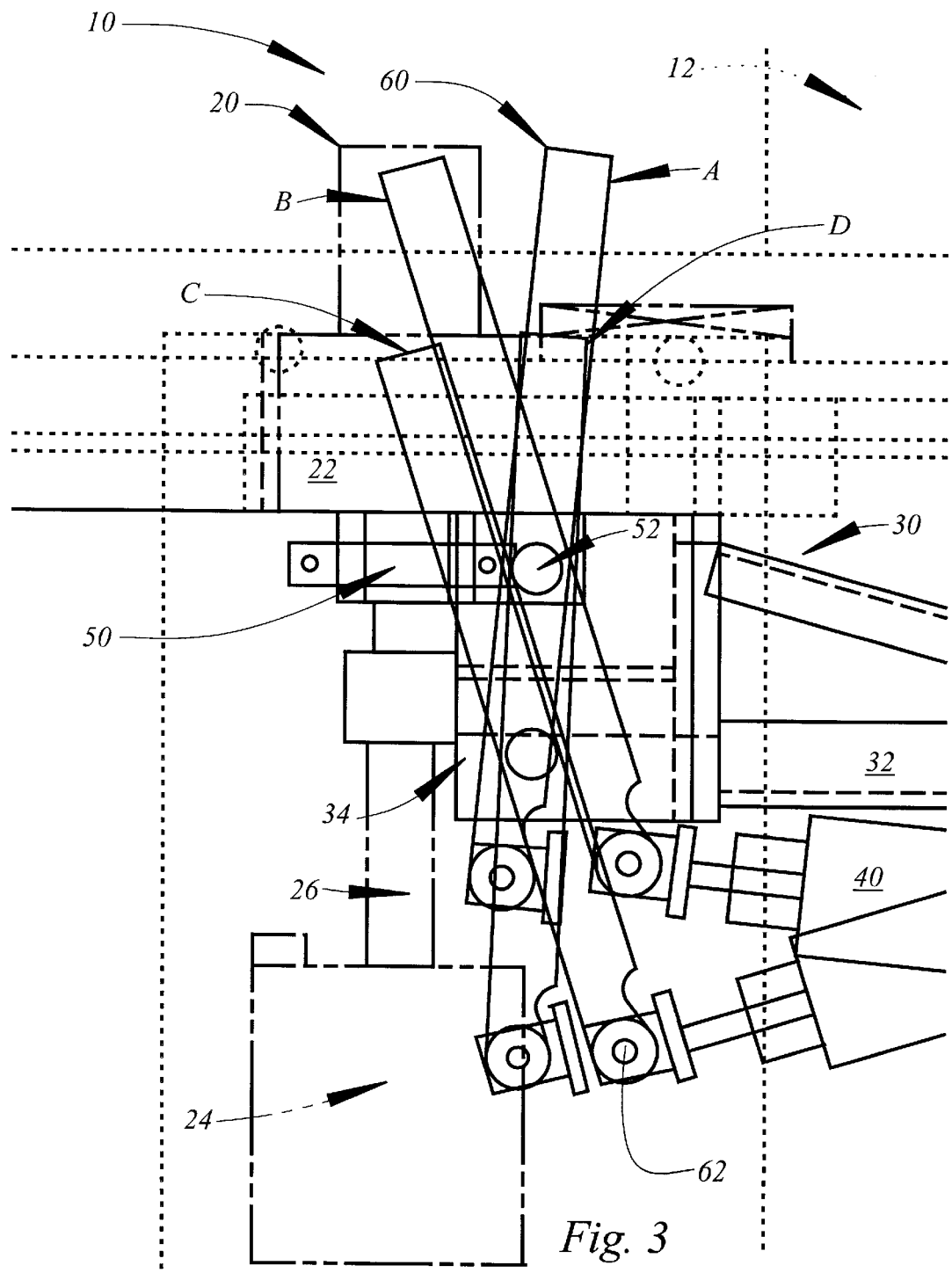
FIG. 3 is a front view of the decelerator of the present invention showing the component parts thereof in each of four operational states.

Referring particularly to FIG. 1, a clamping collar 46 is secured around the rod 26 of the pin stop 20. An arm 48 extends from the clamping collar 46 and has a bracket 50 secured thereto. A pivot pin 52 extends through aligned holes formed in the bracket 50 and through the guide slot 36 of the guide member 34. Referring to FIG. 3, a deceleration pin 60 is pivotally supported on the pivot pin 52 and is pivotally connected to the distal end of the shock absorber 40 by a fastener 62.

The operation of the decelerator 30 of the present invention is illustrated in FIG. 3. The initial position of the decelerator pin 60 of the decelerator 30 is shown at A. The decelerator pin 60 is positioned adjacent the pin stop 20, and slightly ahead of the pin stop 20 with respect to the path of travel of the jigskid 12 in the direction of the arrow 14. As the jigskid 12 moves toward the pin stop 20, it first engages the decelerator pin 60. Engagement of the decelerator pin 60 by the jigskid 12 pivots the decelerator pin 60 about the pivot pin 52 thereby compressing the shock absorber 40. Compression of the shock absorber 40 gradually slows the speed of movement of the jigskid 12 and the component part carried thereby as the jigskid 12 approaches the pin stop 20.

Eventually the jigskid 12, now moving at a much lower speed, engages the pin stop 20. At this point the decelerator pin 60 is positioned as illustrated at B. Substantial pivotal movement of the decelerator pin 60 about the pivot pin 52 has occurred thereby substantially compressing the shock absorber 40.

While the jigskid 12 is engaged with the pin stop 20, various manufacturing operations are carried out on the component part carried by the jigskid 12. At the completion of the manufacturing operations, the pin stop 20 is retracted under the action of the operator 24. As the pin stop 20 is moved downwardly, it carries the clamping collar 46, the arm 48 and the bracket 50 downwardly, thereby moving the pivot pin to the lower end of the guide slot 36 of the guide member 34. Since the decelerator pin 60 is mounted on the pivot pin 52, the decelerator pin 60 is moved downwardly to the position shown at C. Simultaneously, the shock absorber 40 is pivoted downwardly about the axis of the fastener 42.

As soon as the upper end of the decelerator pin 60 clears the lower edge of the jigskid 12, restraining pressure on the shock absorber 40 is released. The shock absorber 40 thereupon expands outwardly, thereby pivoting the decelerator pin 60 from the position shown at C to the position shown at D. Subsequently the operator 24 moves the pin stop 20 upwardly, thereby returning the deceleration pin 60 to the position shown at A. From this point, the operation of the decelerator 30 of the present invention begins again.

Although preferred embodiments of the invention have been illustrated in the accompanying drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. In combination with a conveyer system of the type in which a pin stop is utilized to locate a jigskid and a component part carried thereby at a manufacturing location, a decelerator comprising:

a decelerator pin;

apparatus pivotally supporting the deceleration pin on the pin stop; and a shock absorber operatively connected to the decelerator pin.

2. The decelerator of claim 1 wherein:

the shock absorber has a distal end and a proximal end; and said decelerator pin is pivotally connected to said distal end of the shock absorber by a fastener.

3. The decelerator of claim 2 wherein the apparatus pivotally supporting the deceleration pin on the pin stop comprises:

a guide member having a guide slot formed therein; and a pivot pin operatively connecting said deceleration pin to said guide member.

4. The decelerator of claim 3 further comprising a subframe connected to said guide member, said subframe having means for connection to the conveyor.

5. An apparatus for decelerating a jigskid comprising:

a conveyor system of the type in which a pin stop is reciprocated into the path of travel of a jigskid;

a decelerator pin;

means for pivotally supporting said decelerator pin on said pin stop; and means operatively connected to the deceleration pin for slowing the movement of said jigskid.

6. The apparatus of claim 5 wherein the movement slowing means is a shock absorber.

* * * * *